(12) United States Patent
Wiggemans et al.

(10) Patent No.: US 12,397,605 B2
(45) Date of Patent: Aug. 26, 2025

(54) HIGH VOLTAGE MOTOR-PUMP UNIT

(71) Applicant: Power Packer North America, Inc., Westfield, WI (US)

(72) Inventors: Johnny Antonius Jacobus Wiggemans, Oldenzaal (NL); Marcel Gerardus Maria Nieuwenhuis, Oldenzaal (NL)

(73) Assignee: Power Packer North America, Inc., Westfield, WI (US)

( * ) Notice: Subject to any disclaimer, the term of this patent is extended or adjusted under 35 U.S.C. 154(b) by 0 days.

(21) Appl. No.: 18/578,784

(22) PCT Filed: Jul. 11, 2022

(86) PCT No.: PCT/EP2022/069337
§ 371 (c)(1),
(2) Date: Jan. 12, 2024

(87) PCT Pub. No.: WO2023/285391
PCT Pub. Date: Jan. 19, 2023

(65) Prior Publication Data
US 2024/0300279 A1    Sep. 12, 2024

(30) Foreign Application Priority Data

Jul. 12, 2021 (NL) .................................. 2028698
Jul. 12, 2021 (NL) .................................. 2028699

(51) Int. Cl.
*H02K 5/20* (2006.01)
*B60G 17/04* (2006.01)
(Continued)

(52) U.S. Cl.
CPC .............. *B60G 21/06* (2013.01); *B60G 17/04* (2013.01); *H02K 5/132* (2013.01); *H02K 5/203* (2021.01);
(Continued)

(58) Field of Classification Search
CPC .... H02K 5/203; H02K 2205/09; F04B 53/16; F04B 53/08; F04C 29/045
See application file for complete search history.

(56) References Cited

U.S. PATENT DOCUMENTS

| 5,360,322 A | 11/1994 | Henein et al. |
| 6,095,277 A | 8/2000 | Bohner et al. |

(Continued)

FOREIGN PATENT DOCUMENTS

| CN | 116677607 A | * | 9/2023 |
| CN | 118539658 A | * | 8/2024 |

(Continued)

OTHER PUBLICATIONS

International Search Report and Written Opinion for Application No. PCT/EP2022/069337 dated Sep. 5, 2022 (15 pages).

*Primary Examiner* — Karen Beck
(74) *Attorney, Agent, or Firm* — Michael Best & Friedrich LLP

(57) ABSTRACT

A hydraulic motor pump unit for pressurising a hydraulic fluid in a hydraulic circuit. The motor pump unit includes a motor having a motor stator holding a circular array of coils and a motor rotor having a motor rotor body having an outer circumferential rotor surface holding a circular array of magnets. The motor rotor body is positioned within the motor stator holding the magnets opposite the coils. A pump is drivable connected to the motor rotor. A housing body provided with a pump chamber for housing the pump and a cylindrically shaped coil support for supporting the circular array of coils. The housing comprises at least one housing end cap which is connected to the coil support which housing end cap is provided with a fin pattern for an air cooling of the housing to an environment.

21 Claims, 7 Drawing Sheets

(51) Int. Cl.
　　　*B60G 21/06*　　　(2006.01)
　　　*H02K 5/132*　　　(2006.01)
　　　*H02K 7/14*　　　(2006.01)

(52) U.S. Cl.
　　　CPC ........... *H02K 7/14* (2013.01); *B60G 2200/34* (2013.01); *H02K 2205/09* (2013.01)

(56) References Cited

U.S. PATENT DOCUMENTS

| | | |
|---|---|---|
| 6,425,585 B1 | 7/2002 | Schuelke et al. |
| 10,337,513 B2 | 7/2019 | Reul et al. |
| 2002/0039532 A1 | 4/2002 | Saito et al. |
| 2017/0167491 A1* | 6/2017 | Reul ........................ F04B 17/03 |
| 2020/0106321 A1 | 4/2020 | Homma et al. |
| 2021/0040949 A1* | 2/2021 | Nickel ..................... F01C 21/02 |
| 2021/0277894 A1 | 9/2021 | Homma et al. |

FOREIGN PATENT DOCUMENTS

| | | | | |
|---|---|---|---|---|
| DE | 102015015863 A1 * | 6/2017 | .............. F04B 17/03 |
| JP | H11210642 A | 8/1999 | |
| JP | 2013238169 A | 11/2013 | |
| KR | 10-2020-0093875 A | 8/2020 | |
| WO | 2016126251 A1 | 8/2016 | |

* cited by examiner

HIGH VOLTAGE MOTOR-PUMP UNIT

CROSS REFERENCE TO RELATED APPLICATIONS

This application is a U.S. National Phase filing of International Application No. PCT/EP2022/069337, filed on Jul. 11, 2022, designating the United States of America, claiming priority to and the benefit of the Dutch applications NL2028698 and NL2028699, the entire contents of which are incorporated by reference.

FIELD OF TECHNOLOGY

The invention relates to a hydraulic motor pump unit for pressurising a hydraulic fluid in a hydraulic circuit.

In particular, the hydraulic motor pump unit is provided with a crescent gear pump. Such a crescent gear pump is suitable to be used in an appliance in which the motor pump unit is continuously in operation, i.e. for at least 10 minutes, and in which the motor pump unit operates under high pressures, i.e. of about 150 bar.

More in particular, the hydraulic motor pump unit is configured to be used in a stabiliser system installed on a vehicle. More particularly to be used in such a stabiliser system in which roll restraining force exerted by a stabiliser bar is changeable by an operation of an actuator which is operable connected to the hydraulic motor pump unit.

BACKGROUND/BACKGROUND OF THE INVENTION

JP-A-2002-518245 discloses an active stabiliser system in which an actuator having an electric motor is a drive source is arranged such that roll restraining force to be exerted by a stabiliser bar is changeable by controlling an operation of the actuator. The electric motor as the drive source is controlled via a driver such as an inverter.

A problem to known hydraulic motor pump units is often that it has a poor heat dissipation. Many known hydraulic motor pump unit are typically suitable to be used incidentally, e.g. to actuate a transmission starting motor. In a continuous operation under a high pressure of at least 100 bars, these known hydraulic motor pump units are vulnerable to get overheated. In particular, under a high voltage of 400V or even 800V, a large amount of heat will be generated by the coils which heat will drastically shorten a possible operational duration and will make these hydraulic pump units unsuitable to be used in a continuous operation under high pressure, e.g. in an active roll stabilisation system.

In particular, it is another object to provide a hydraulic motor pump unit having a compact structure in combination with a high pump effectiveness provided by the internal crescent gear pump. The compact structure allows the hydraulic motor pump unit to be installed at a narrow building space.

Regarding the above-mentioned prior art, it is remarked that any discussion of documents, acts, materials, devices, articles or the like included in the present specification is for the purpose of providing a context for the present invention, and is not to be taken as an admission that any such matters form part of the prior art or were before the priority date of each claim of this application common general knowledge in the field relevant to the present invention.

The general object of the present invention is to at least partially eliminate the above mentioned drawbacks and/or to provide a usable alternative. More specific, it is an object of the invention to provide a hydraulic motor pump unit having a compact configuration in which a crescent pump gear and an electric drive are integrally housed in which the motor pump unit is provided with a an effective cooling to prevent overheating of the motor pump unit in a continuous operation under a high pressure.

SUMMARY OF THE INVENTION

According to a first aspect of the invention, this object is achieved by a hydraulic motor pump unit according to claim 1.

In the first aspect, a hydraulic motor pump unit for pressurising a hydraulic fluid in a hydraulic circuit is provided. The hydraulic motor pump unit comprises:
 a motor having a motor stator holding a circular array of coils and a motor rotor having a motor rotor body having an outer circumferential rotor surface holding a circular array of magnets, in which the motor rotor body is positioned within the motor stator holding the magnets opposite the coils;
 a pump drivable connected to the motor rotor; and
 a housing having a housing body provided with a pump chamber for housing the pump and a cylindrically shaped coil support for supporting the circular array of coils;
wherein the housing comprises at least one housing end cap which is connected to the coil support which housing end cap is provided with a fin pattern for an air cooling of the housing to an environment.

The hydraulic motor pump unit according to the first aspect of the invention is beneficial in that it may perform for a continuous duration of at least 10 minutes, in particular of at least 20 minutes under a high pressure of at least 100 bar, in particular at least 150 bar, in providing a flow of at least 15 liters/minute, in particular at least 20 liters/minute. The motor pump unit has a compact configuration. The presence of the fin pattern at one or both housing end caps is beneficial in providing an air cooling. Herewith, a dry concept of the motor pump unit is provided.

In an embodiment according to the invention, the housing has a front housing end cap and a rear housing end cap which are each provided with a fin pattern, wherein the coil support is sandwiched in between the front and rear housing end cap. Herewith, the motor pump unit has a beneficial compact configuration and includes a proper air cooling.

In an embodiment according to the invention, at least a portion of 50%, in particular at least 70%, more in particular at least 90% of an end face surface of the housing end cap is covered by the fin pattern.

In an embodiment according to the invention, the at least one housing end cap is integrally shaped with the housing body.

In an embodiment according to the invention, the at least one housing end cap is provided with an outlet port and an inlet port in fluid communication with the pump chamber, wherein the inlet port and the outlet port are positioned at a central region of the end face of the housing end cap.

In an embodiment according to the invention, at least one of the outlet port and inlet port is fluidly connected to the pump chamber by respectively a pressure line for pressurising an actuator and a return line for returning hydraulic fluid to the pump chamber, wherein the pressure line and/or return line extends along a cooling path through the housing end cap to provide liquid cooling to the housing end cap.

In a further embodiment according to the invention, the return line originating from the inlet port extends across the housing end cap along the cooling flow path for cooling the housing end cap, wherein with respect to the pressure line, the return line extends along a significant longer cooling path length, in particular at least 3 times longer, through the housing.

In an embodiment according to the invention, the cooling path extends across at least 60%, in particular at least 80% of a cross sectional region of the housing end cap.

In an embodiment according to the invention, the housing body has a central passage for receiving the motor rotor body, wherein the central passage is provided with a first and second bearing for journaling the motor rotor body, wherein the pump chamber is positioned in between the first and second bearing.

In an embodiment according to the invention, the first and/or second bearing are a plain bearing allowing a lubricating through flow of hydraulic fluid originating from the pump chamber to an opposite side of the respective first and/or second bearing.

In an embodiment according to the invention, the lubricating through flow at the second plain bearing is passed to the return line to return the lubricating through flow back to the pump chamber.

In an embodiment according to the invention, the motor is a brushless motor, in particular a brushless DC motor, more in particular a high voltage brushless DC motor. Advantageously, the brushless motor may further contribute to a compactness of the motor pump unit.

In an embodiment according to the invention, the coils of the motor have an electrical connection at the rear housing end cap, wherein the pressure line and return line only extend through the front housing end cap. This may further contribute to a compactness of the motor pump unit.

In an embodiment according to the invention, the pump is a gear pump, in particular an internal gear pump. Preferably, the gear pump is a crescent gear pump including a crescent member.

The crescent member is positioned inside an outer gear wheel aside an inner gear wheel. In particular, the inner gear wheel is driven by the motor rotor, in which the inner gear wheel is connected to the motor rotor, in particular to a motor rotor shaft.

In an embodiment of the motor pump unit according to the invention, the gear pump is a bi-directional pump, or a so-called reversible pump. The gear pump has a first and second port which depending on a rotational direction of the driving motor serve as a suction port or pressure port. The first and second port are in fluid communication with the first pump chamber by a first and second line which in dependence of the rotational direction of the driving motor serve as a pressure or return line.

In an embodiment according to the invention, motor rotor body comprises a rotor shaft which has a centrally positioned inner rotor shaft channel along an axial axis in fluid communication with the inlet port.

In a further embodiment according to the invention, the rotor shaft channel extends from the first bearing beyond the second bearing for allowing a flow of hydraulic fluid back to the inlet port.

In an embodiment according to the invention, the rotor shaft is at a distal end connected to a rotor flange and a cylindrically shaped magnet holder.

In a further embodiment according to the invention, the rotor flange and magnet holder are incorporated in a one-piece item.

In an embodiment according to the invention, the motor rotor body is connected to an angular decoder for determining a rotational position of the motor rotor body.

Further, in the first aspect, the invention relates to a vehicle comprising a hydraulic motor pump unit according to the invention. In particular, the invention relates to a vehicle sub-assembly comprising a motor pump unit according to the invention wherein the vehicle sub-assembly is arranged to be continuously operated, in particular for at least 10 minutes, under a high pressure, in particular of at least 100 bar. More in particular, the invention relates to a vehicle active roll stabilisation system including a stabiliser bar to be positioned in between a left and right wheel suspension and a hydraulic actuator connected to the stabiliser bar, wherein the hydraulic actuator is controlled by a control unit and actuated by a motor pump unit according to the invention.

P35097-01

In a second aspect according to the invention a hydraulic motor pump unit for pressurising a hydraulic fluid in a hydraulic circuit is provided which includes a crescent gear pump. Such a crescent gear pump is suitable to be used in an appliance in which the motor pump unit is continuously in operation, i.e. for at least 10 minutes, and in which the motor pump unit operates under high pressures, i.e. of about 150 bar.

More in particular, the hydraulic motor pump unit is configured to be used in a stabiliser system installed on a vehicle. More particularly to be used in such a stabiliser system in which roll restraining force exerted by a stabiliser bar is changeable by an operation of an actuator which is operable connected to the hydraulic motor pump unit.

WO16126251 provides an introduction in prior art saying that conventional crescent internal gear pumps typically include rotatably driven, intermeshing ring and pinion gears that are disposed in an eccentric relationship within a cylindrical gear housing. The ring gear, pinion gear, and the housing are sandwiched between a front cover and an end cover. A crescent is disposed radially intermediate the pinion gear and the ring gear. During operation of the pump, the ring and pinion gears are rotatably driven, and fluid from a fluid inlet in the gear housing is entrained within expanding gaps between the teeth of the ring and pinion gears and the crescent. As the ring and pinion gears continue to rotate, the gaps shrink and the entrained fluid is forced to exit the gear housing through a fluid outlet.

A disadvantage that is commonly associated with crescent internal gear pumps of the type described above is that the efficiency of such a pump is highly dependent on the precision of clearances between the components of the pump. For example, pump efficiency is influenced by the sizes of clearances between the faces of the ring and pinion gears and the faces of the front and end covers, and also by the presence and size of gaps between the end of the crescent and the front cover. Ideally, no gap would exist between the end of the crescent and front cover.

In common practice, the tight tolerances that are required in conventional crescent internal gear pumps are achieved using precise machining or even manual hand lapping. This drives manufacturing to use very expensive machines and machining techniques. Often, it also requires that components be sorted in a time-consuming, laborious manner in order to identify combinations of components that achieve desired relative clearances. Still further, individual components must generally be held to tolerances in excess of what is required for a particular component in order to account for tolerance stack-up when the components are assembled.

In view of the foregoing, it would be advantageous to provide an efficient crescent internal gear pump that can be manufactured without applying strict tolerances to individual components of the pump.

An exemplary tolerance independent crescent internal gear pump in accordance with an embodiment may include a front cover, an end cover, a ring gear and a pinion gear disposed within a gear housing in an eccentric, intermeshing relationship, the housing being disposed intermediate the front cover and the end cover, and a crescent disposed radially intermediate the ring gear and the pinion gear, the crescent partially extending into a complementary slot in the end cover. The gear housing, the ring gear, and the pinion gear may have substantially the same thickness. The exemplary tolerance independent crescent internal gear pump may further include a shim disposed intermediate the end cover and the gear housing for establishing a desired clearance therebetween.

An exemplary method of manufacturing a tolerance independent crescent internal gear pump in accordance with an embodiment may include forming a gear housing, a ring gear, a pinion gear, a front cover, and an end cover as separate components, wherein the crescent is formed with a length that is greater than thicknesses of the gear housing, the ring gear, and the pinion gear. The method may further include match grinding the gear housing, the ring gear, and the pinion gear to substantially the same thickness. The method may further include partially inserting the crescent into a complementary slot in the end cover, wherein a length of a portion of the crescent that protrudes from the slot is greater than the thicknesses of the gear housing, ring gear, and pinion gear. The method may further include preliminarily assembling the gear housing, the ring gear, the pinion gear, the front cover, and the end cover using mechanical fasteners, whereby a front face of the crescent is brought into engagement with the front cover. The method may further include tightening the mechanical fasteners to draw the gear housing, the ring gear, the pinion gear, the front cover, and the end cover into secure longitudinal engagement with one another, whereby the front cover forcibly drives the crescent further into the slot.

JP11210642A2 discloses an internal crescent gear pump which can reduce the number of part items, and can realize a small size. In the internal gear pump 1, an inner tooth gear 23 has a rotor 35 fixing a plural magnets 37 on its outer periphery, a stator coil 31 arranged at the outer side of the rotor is provided at the outer side of the inner tooth gear 23, and a power is fed to the stator coil 31 so as to drive to rotate the inner tooth gear 23. Since a so-called brushless motor is formed to the inscribed gear pump 1 itself, the internal gear pump 1 can be driven directly by feeding the power. Since it is not necessary to prepare a driving motor separately, the structure is made simple, and the number of part items can be reduced.

This known hydraulic motor pump unit is beneficial because of its compact structure in combination with a high pump effectiveness provided by the internal crescent gear pump. The compact structure allows the hydraulic motor pump unit to be installed at a narrow building space.

However, a problem to this hydraulic motor pump unit is that it has a poor heat dissipation. This known hydraulic motor pump unit is typically suitable to be used incidentally, e.g. to actuate a transmission starting motor. In a continuous operation under a high pressure of at least 100 bars, this known hydraulic motor pump unit is vulnerable to get overheated. In particular, under a high voltage of 400V or even 800V, a large amount of heat will be generated by the coils which heat will drastically shorten a possible operational duration and will make this hydraulic pump unit unsuitable to be used in a continuous operation under high pressure, e.g. in an active roll stabilisation system.

Regarding the above-mentioned prior art, it is remarked that any discussion of documents, acts, materials, devices, articles or the like included in the present specification is for the purpose of providing a context for the present invention, and is not to be taken as an admission that any such matters form part of the prior art or were before the priority date of each claim of this application common general knowledge in the field relevant to the present invention.

The general object of the present invention is to at least partially eliminate the above mentioned drawbacks and/or to provide a usable alternative. More specific, according to a second aspect of the invention, it is an object of the invention to provide a hydraulic motor pump unit having a compact configuration in which a crescent pump gear and an electric drive are integrally housed in which the motor pump unit is provided with a an effective cooling to prevent overheating of the motor pump unit in a continuous operation under a high pressure.

In a second aspect, according to the invention, this object is achieved by a hydraulic motor pump unit according to clause 1.

A hydraulic motor pump unit for pressurising a hydraulic fluid in a hydraulic circuit is provided.

The motor pump unit comprises a motor having a motor stator and a motor rotor. The motor stator holds a circular array of coils. The motor rotor includes a motor rotor body holding a circular array of magnets in a position opposite the coils of the motor stator. An inner space is formed in between the motor stator and the motor rotor.

Further, the motor pump unit comprises a crescent gear pump driveable connected to the motor rotor. The crescent gear pump comprises an inner gear wheel and an outer gear wheel. The inner gear wheel is journalled by a shaft member. The outer gear wheel is connected to the motor rotor body. A crescent member is positioned inside the outer gear wheel aside the inner gear wheel.

Further, the motor pump unit comprises a housing for housing the crescent gear pump. The housing is formed by clamping a first housing portion on a second housing portion. The crescent gear pump is positioned in between the first and second housing portion.

The first housing portion comprises a first pump chamber. The first pump chamber is configured to receive the crescent gear pump. The first pump chamber journals the motor rotor, in particular the outer gear wheel, by a radial form fit. The first pump chamber has a first pump chamber bottom and a first pump chamber circumferential wall. The first pump chamber circumferential wall forms a plain bearing for journaling the motor rotor, in particular the outer gear wheel. The first pump chamber circumferential wall is dimensioned for rotatably receiving the motor rotor.

The motor pump unit according to the second aspect of the invention is improved in that an axial form fit of the crescent gear pump in between the first and second housing portion is provided by a predetermined height of both the crescent member and the shaft member. Both the predetermined height of the crescent member and the predetermined height of the shaft member define the axial form fit. In other words, the crescent gear pump is locked in position in between the first and second housing portion in an internal space, a gear pump space, having a space height which is determined by both the predetermined height of the crescent member and the shaft member. The predetermined height of the crescent member and the predetermined height of the shaft member define a predetermined axial gap which remains in between the motor rotor and an opposite surface, a top or bottom side, of the first and second housing portion. Not only the shaft member, but also the crescent member determine the axial gap which warrant an accurate clearance for operation of the gear pump at a relative high pressure and which reduces a possible impairment of the clearance due to a possible deformation of a housing portion. Herewith, the first and second housing portion form a thrust bearing to the motor rotor, in particular to the outer gear wheel. The thrust bearing is a plain bearing. The predetermined axial gap allows a radially directed flow of hydraulic fluid to pass along the outer gear wheel to the inner space between the motor rotor and the motor stator. Herewith, the thrust bearing operates as a hydrostatic bearing.

The improvement of the axial form fit which allows a flow of hydraulic fluid to the inner space in between the motor rotor and the motor stator is beneficial in cooling the motor pump unit. The hydraulic fluid originating from the gear pump space flows into the inner space along the coils held by the motor stator. A cooling path is provided. Generated heat by the coils is dissipated by the flow of hydraulic fluid.

The shaft member and the crescent member are both positioned in the first pump chamber. The crescent member may be incorporated in the first housing portion. Preferably, the crescent member is integrally formed with the first housing portion. In particular, the crescent member is integrally shaped with the first pump chamber. The crescent member is preferably formed out of one piece with the first housing portion. The predetermined height of the crescent member may be obtained by machining, e.g. flat honing, in a clamping tool in which both the height of the crescent member and also the height of the shaft member is machined.

In an embodiment of the motor pump unit according to the invention, the crescent member may have a crescent member end face formed by a first and second stopper end face. The first and second stopper end face may each be formed by a protrusion. Each protrusion forms a contact surface which is in assembly of the motor pump unit in abutting engagement with the opposite surface of one of the first and second housing portion, in particular with a bottom side of the second housing portion.

In a further embodiment of the motor pump unit according to the invention, the first and second protrusion may be formed by a first and second pin-shaped stopper. Each pin-shaped stopper may be a separate item fixed to the first housing portion. Each stopper has a stopper end face to be in abutting engagement with the bottom side of the second housing portion.

In an embodiment of the motor pump unit according to the invention, the first pump chamber of the first housing portion is in fluid communication with a pressure line and a return line which are respectively in fluid communication with an outlet port and an inlet port for respectively supplying and returning hydraulic fluid to and from a hydraulic actuator in the hydraulic circuit.

The crescent member is in abutting engagement with a bottom side of the second housing portion. Preferably, the second housing portion comprises a second pump chamber for receiving the crescent gear pump, in which the crescent member is in abutting engagement with a pump chamber bottom surface of the second pump chamber. Both the first and second pump chamber journal the motor rotor. The motor rotor, in particular the outer gear wheel, is journaled at two separate height levels. The motor rotor is journaled at a bottom region and a top region. Advantageously, journaling the motor rotor by the first and second pump chamber increases a stability of the motor rotor which is especially beneficial at high rotational speeds of the crescent gear pump. An instability and accompanying reduction of effectiveness which may be caused by a swivelling of the motor rotor can be reduced.

In an embodiment of the motor pump unit according to the invention, the crescent member may be integrally formed with the second housing portion. Preferably, the crescent member is integrally formed with the first housing portion provided with the pressure line and the return line.

The inner gear wheel is journalled by the shaft member. The inner gear wheel may be attached directly to the shaft member. Alternatively, the inner gear wheel may comprise a radial bearing, in particular a plain bearing, to bear upon the shaft member.

In an embodiment of the motor pump unit according to the invention, the shaft member is a hollow shaft. Preferably, the hollow shaft is a separate item. The first housing portion may comprise a blind hole in alignment with a threaded hole for receiving the hollow shaft in the blind hole and for fastening the hollow shaft by a central bolt. The blind hole is eccentrically positioned with respect to the first pump chamber. Hence, the inner gear wheel is positioned with a predetermined off-set with respect to the outer gear wheel.

In an embodiment of the motor pump unit according to the invention, the second housing portion comprises a through hole for receiving the hollow shaft to align the second housing portion on the first housing portion. The through hole of the second housing portion has a hole length which is dimensioned in accordance with a length of the shaft member. The central bolt extending through the hollow shaft has a bolt head, in particular including a bolt ring, extending across the hollow shaft to clamp the second housing portion.

In an embodiment of the motor pump unit according to the invention, the first and second housing portion are further circumferentially clamped to each other. A plurality of bolts may be arranged along a circumferential edge of one of the housing portions to clamp the housing portions together. The central bolt warrants an abutment of the crescent member to one of the housing portions. Herewith, the central bolt beneficially assures an operational effectiveness of the motor pump unit.

In an embodiment of the motor pump unit according to the invention, a return channel extends in between the inner space and the return line to allow a hydraulic fluid to flow from the inner space back to the first pump chamber. The return channel may be formed by a borehole extending from an outer surface of the first housing portion to the return line. The return channel enables a circulation of hydraulic fluid from the first pump chamber to the inner space and subsequently from the inner space back to the first pump chamber. The return line has a low pressure relative to the pressure line, such that the hydraulic fluid flow is sucked from the inner space to generate the circulation. Due to the circulation through the inner space, heat is dissipated from the coils. The heat is transferred away from the coils and discharged from the motor pump unit.

In a further embodiment of the motor pump unit according to the invention, the crescent gear pump is a bi-directional pump, or a so-called reversible pump. The crescent gear pump has a first and second port which depending on a rotational direction of the motor serve as a suction port or pressure port. The first and second port are in fluid communication with the first pump chamber by a first and second line which in dependence of the rotational direction of the motor serve as a pressure or return line. Each of the first and second line are in fluid communication with a return channel originating from the inner space. Each return channel is provided with a check valve. The check valve is arranged to be closed when a fluid pressure is higher in the first or second line than in the inner space. Hence, only the first or second line serving as a return line is used to circulate hydraulic fluid.

In an embodiment of the motor pump unit according to the invention, the coils are adapted to transfer heat to the hydraulic fluid in the inner space in between the motor stator and the motor rotor. Each coil is at least partially immersed in the hydraulic fluid present in the inner space. Each coil is formed by a wound coil wire in which the coil wire is electrically isolated. To improve heat transfer, each coil is thermally exposed to the hydraulic fluid in the inner space in which each coil is free from an enclosing thermal insulation, in particular a plastic or resin containing material. Without such a thermal insulation, each coil is in direct thermal contact with the hydraulic fluid in the inner space which beneficially contributes in a heat transfer.

In an embodiment of the motor pump unit according to the invention, the coils may be provided with a protective coverage, in particular a metal outer layer, e.g. an aluminium coating. Herewith, the coils may be protected from damage by oxidation or disintegration by the hydraulic fluid.

Further, the invention relates to a vehicle comprising a hydraulic motor pump unit according to the invention. In particular, the invention relates to a vehicle sub-assembly comprising a motor pump unit according to the invention wherein the vehicle sub-assembly is arranged to be continuously operated, in particular for at least 10 minutes, under a high pressure, in particular of at least 100 bar. More in particular, the invention relates to a vehicle active roll stabilisation system including a stabiliser bar to be positioned in between a left and right wheel suspension and a hydraulic actuator connected to the stabiliser bar, wherein the hydraulic actuator is controlled by a control unit and actuated by a motor pump unit according to the invention.

Embodiments according to the second aspect of the invention are defined by the following clauses:

1. Hydraulic motor pump unit (1) for pressurising a hydraulic fluid in a hydraulic circuit, wherein the motor pump unit comprises:
    a motor (2) having a motor stator (20) holding a circular array of coils (22) and a motor rotor (24) including a motor rotor body (25) holding a circular array of magnets (29) in a position opposite the coils (22) of the motor stator (20), wherein an inner space (IS) is formed in between the motor stator (20) and the motor rotor (24);
    a gear pump (3) drivable connected to the motor rotor (24), wherein the gear pump (3) comprises:
        an outer gear wheel (32), wherein the outer gear wheel (32) is connected to the motor rotor body (25);
        an inner gear wheel (31) being journalled by a shaft member (26) and being positioned inside the outer gear wheel (32); and
        a crescent member (39) being positioned inside the outer gear wheel (32) aside the inner gear wheel (31);
    a housing (4) for housing the gear pump (3), wherein the housing (4) is formed by clamping a first housing portion (411) on a second housing portion (412) in which the gear pump (3) is positioned in a gear pump space (GPS) in between the first and second housing portion (411,412), wherein the first housing portion (411) comprises a first pump chamber (4101) for receiving the gear pump (3), wherein a pump chamber circumferential wall (415) of the first pump chamber (4101) journals the motor rotor (24), in particular the outer gear wheel (32), by providing a radial form fit (RB1), wherein both a predetermined height of the crescent member (39) and a predetermined shaft height of the shaft member (26) measured from a pump chamber bottom surface (414) provide an axial form fit (TB1) of the gear pump (3) in between the first and second housing portion (411, 412), such that a predetermined axial gap remains in between the motor rotor (24) and an opposite surface of one of the first and second housing portion (411, 412) to allow a radially directed flow of hydraulic fluid along a cooling path (37) to pass along the outer gear wheel (32) to the inner space (IS) between the motor rotor (24) and the motor stator (20).

2. Hydraulic motor pump unit (1) according to clause 1, wherein the crescent member (39) is integrally formed with the first housing portion (411), in particular integrally formed with the first pump chamber (4101).

3. Hydraulic motor pump unit (1) according to clause 1 or 2, wherein the crescent member has a first and second stopper end face (391,392), in particular formed by a first and second protrusion, wherein each stopper end face is configured to be in abutting engagement with a bottom side of the second housing portion (412).

4. Hydraulic motor pump unit (1) according to any of the preceding clauses, wherein the second housing portion (412) comprises a second pump chamber (4102) for receiving the crescent gear pump (3), wherein both the first and second pump chamber (4101, 4102) journal the motor rotor (24), in particular the outer gear wheel (32), by a radial form fit.

5. Hydraulic motor pump unit (1) according to clause 4, wherein the crescent member (39) is in abutting engagement with a pump chamber bottom of the second pump chamber (4102).

6. Hydraulic motor pump unit (1) according to any of the preceding clauses, wherein the shaft member is a hollow shaft, in particular formed by a separate item, wherein the first housing portion (411) comprises a blind hole in alignment with a threaded hole for receiving the hollow shaft and for fastening the hollow shaft by a central bolt (418).

7. Hydraulic motor pump unit (1) according to any of the preceding clauses, wherein the second housing portion (412) comprises a through hole for receiving the hollow shaft and wherein the central bolt is arranged to clamp the second housing portion (412) on the first housing portion (411).

8. Hydraulic motor pump unit (1) according to any of the preceding clauses, wherein a return channel (340) extends in between the inner space (IS) and the return line (34) to allow a hydraulic fluid to flow from the inner space (IS) back to the first pump chamber (4101).

9. Hydraulic motor pump unit (1) according to clause 8, wherein the crescent gear pump (3) is a bi-directional pump having a first and second line which serve as a pressure line (33) and a return line (34) in dependence of a rotational direction of the crescent gear pump (3), in which a first and second return channel extend respectively in between the inner space (IS) and one of the pressure and return line (33, 34), wherein each of the first and second return channel (340) are provided with a check valve (341).

10. Hydraulic motor pump unit (1) according to any of the preceding clauses, wherein the coils (22) are free from a thermal insulation, such that the coils are directly thermally exposed to a hydraulic fluid in the inner space (IS).

11. Hydraulic motor pump unit (1) according to clause 10, wherein the coils (22) are provided with a protective metal coverage, e.g. an aluminium coating, to prevent disintegration of the coils.

12. Vehicle sub-assembly comprising a hydraulic motor pump unit according to any of the clauses 1-11, wherein the vehicle sub-assembly is arranged to be continuously active during a ride for at least 10 minutes in which the hydraulic motor pump unit is then operable under a high pressure of at least 100 bars for actuating a hydraulic actuator.

13. Vehicle sub-assembly according to clause 12, wherein the vehicle sub-assembly is a vehicle active roll stabilisation system including a stabiliser bar to be positioned in between a left and right wheel suspension and including a hydraulic actuator connected to the stabiliser bar, wherein the hydraulic actuator is controlled by a control unit and actuated by the motor pump unit (1).

14. Vehicle comprising a hydraulic motor pump unit according to any of the clauses 1-11 and/or a vehicle sub-assembly according to clause 12 or 13.

15. Hydraulic motor pump unit (1) for pressurising a hydraulic fluid in a hydraulic circuit, wherein the motor pump unit comprises:
- a motor (2) having a motor stator (20) holding a circular array of coils (22) and a motor rotor (24) including a motor rotor body (25) holding a circular array of magnets (29) in a position opposite the coils (22) of the motor stator (20), wherein an inner space (IS) is formed in between the motor stator (20) and the motor rotor (24);
- a gear pump (3) drivable connected to the motor rotor (24), wherein the gear pump (3) comprises:
  - an outer gear wheel (32), wherein the outer gear wheel (32) is connected to the motor rotor body (25);
  - an inner gear wheel (31) being journalled by a shaft member (26) and being positioned inside the outer gear wheel (32); and
  - a crescent member (39) being positioned inside the outer gear wheel (32) aside the inner gear wheel (31);
- a housing (4) for housing the gear pump (3), wherein the housing (4) is formed by clamping a first housing portion (411) on a second housing portion (412) in which the gear pump (3) is positioned in a gear pump space (GPS) in between the first and second housing portion (411,412), wherein the first housing portion (411) comprises a first pump chamber (4101) for receiving the gear pump (3), wherein a pump chamber circumferential wall (415) of the first pump chamber (4101) journals the motor rotor (24), in particular the outer gear wheel (32), by providing a radial form fit (RB1), wherein a predetermined height of the crescent member (39) measured from a pump chamber bottom surface (414) provide an axial form fit (TB1) of the gear pump (3) in between the first and second housing portion (411, 412), such that a predetermined axial gap remains in between the motor rotor (24) and an opposite surface of one of the first and second housing portion (411, 412) to allow a radially directed flow of hydraulic fluid along a cooling path (37) to pass along the outer gear wheel (32) to the inner space (IS) between the motor rotor (24) and the motor stator (20).

BRIEF DESCRIPTION OF THE DRAWINGS

The invention will be explained in more detail with reference to the appended drawings. The drawings show a practical embodiment according to the invention, which may not be interpreted as limiting the scope of the invention. Specific features may also be considered apart from the shown embodiment and may be taken into account in a broader context as a delimiting feature, not only for the shown embodiment but as a common feature for all embodiments falling within the scope of the appended claims, in which:

DETAILED DESCRIPTION

Figure 1:
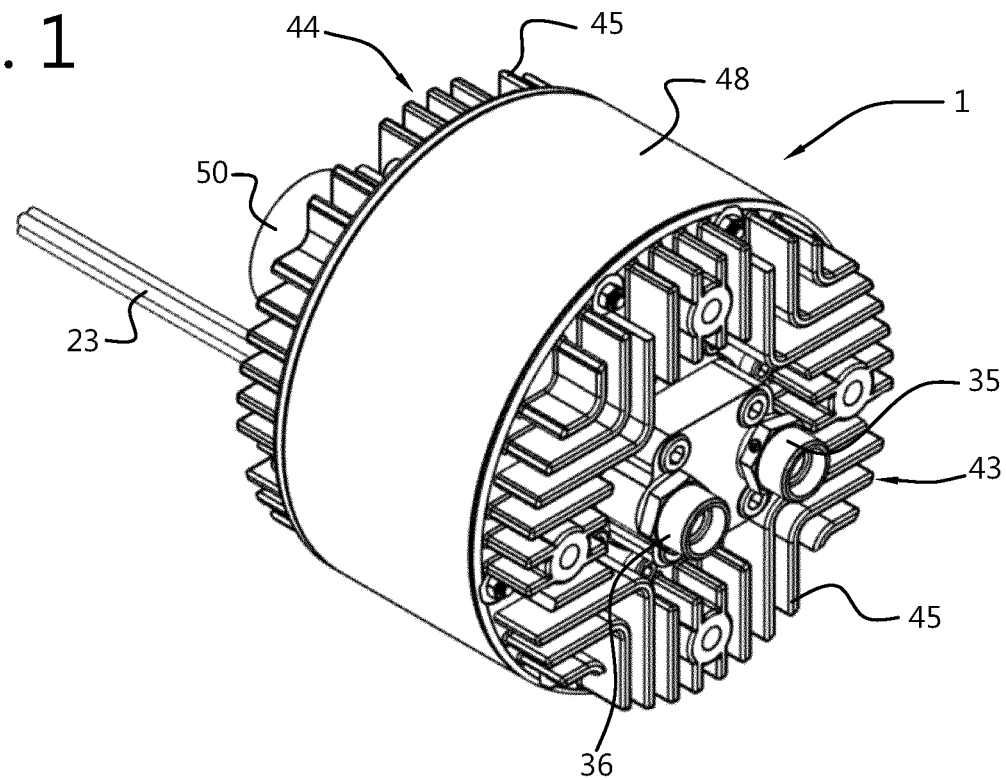
FIG. 1 shows a frontal perspective view of an embodiment of a motor pump unit according to a first aspect of the invention.
Figure 2:
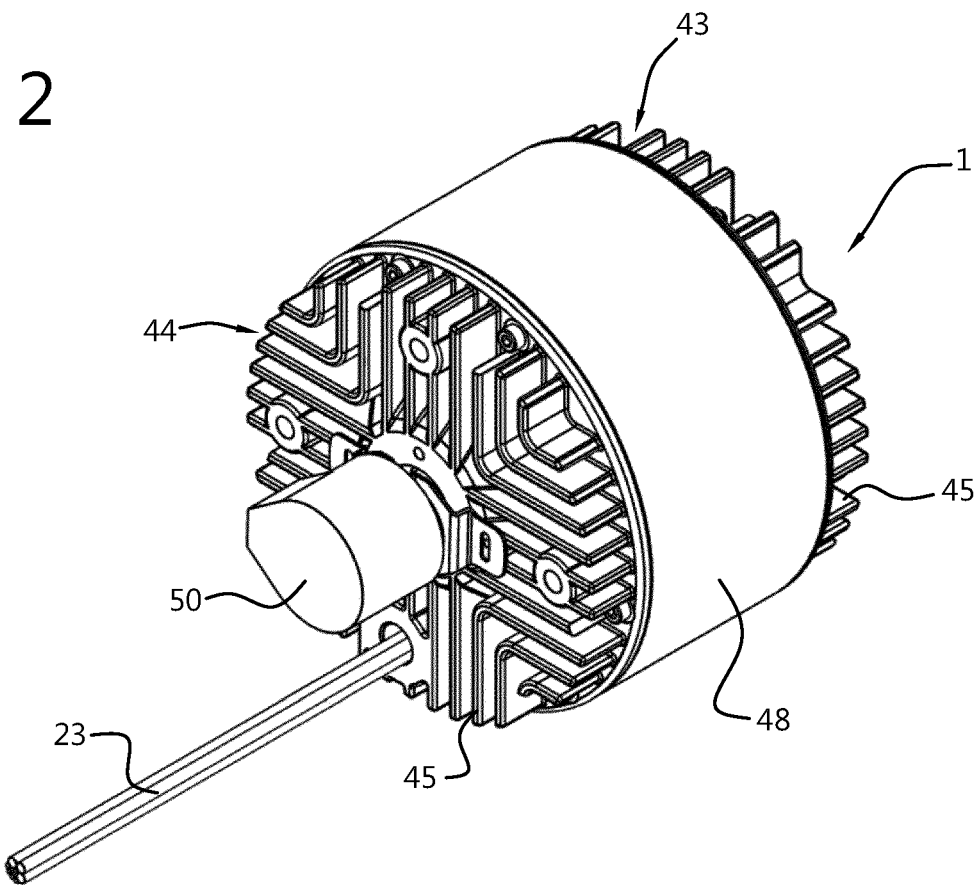
FIG. 2 shows a rear perspective view of the motor pump unit of FIG. 1.

In the FIGS. 1-7, the motor pump unit is denoted overall by reference numeral 1. Identical reference signs are used in the drawings to indicate identical or functionally similar components. To facilitate comprehension of the description and of the claims the words longitudinal, axial, frontal, proximal, rear and distal are used in a non-limiting way.

FIG. 1 shows a hydraulic motor pump unit 1 according to a first aspect of the invention. The hydraulic motor pump unit is configured to pressurise a hydraulic fluid in a hydraulic circuit. In particular, the motor pump unit 1 is configured to pressurise a vehicle stabiliser system including a stabiliser bar. More in particular, the motor pump unit 1 is configured to pressurise a vehicle roll stabilisation system.

The motor pump unit comprises a motor 2 for driving a pump 3 inside a housing 4.

The motor 2 has a motor stator 20 including a circular array of coils 22 and a motor rotor 24 having a motor rotor body 25. The motor rotor body 25 has an outer circumferential rotor surface which holds a circular array of magnets 29. The magnets 29 are embedded in the outer circumferential rotor surface and held by a magnet holder 28. The motor rotor body 25 is positioned within the motor stator 20, such that the magnets 29 are positioned opposite the coils 22.

The pump 3 is driveable connected to the motor rotor 24. The pump comprises an internal gear pump 30. The internal gear pump is positioned inside a pump chamber 410 of the housing 4.

The internal gear pump 30 comprises an inner gear wheel 31 and an outer gear wheel 32. Here, the inner gear wheel 31 is drivable connected to the motor rotor 24. The inner gear wheel 31 is connected to a proximal end of a rotor shaft 26. At a distal end, the rotor shaft 26 is connected to a rotor flange 27 which rotor flange is at an outer circumference connected to the magnet holder 28.

A pressure line 33 and a return line 34 extend in between the pump chamber 410 and respectively an outlet port 35 and inlet port 36 at an outer surface of the housing 4. The return line 34 forms a cooling path 37. Externally originating hydraulic fluid enters the motor pump unit via the inlet port 36 and flows along the cooling path 37 to the pump chamber 410. The cooling path 37 extends through a major portion of the housing to contribute to a cooling of the housing.

The housing 4 has a centrally positioned housing body 41 which is provided with the pump chamber 410 for receiving the pump 3. Here, the housing body 41 is formed by a first housing portion 411 and a second housing portion 412.

Further, the housing 4 has a cylindrically shaped coil support 42 for supporting the circular array of coils 22. The coil support 42 is formed by a stack of ring-shaped members in an axial direction. At an inner side of the stack, the array of coils 22 is wound. At an outer side, the coil support 42 is surrounded by a casing 48.

The housing 4 comprises at least one housing end cap 43. Preferably, the housing end cap 43 is made of an aluminium material. Here, the housing 4 comprises a front housing end cap 43 and a rear housing end cap 44. The coil support 42 is sandwiched in between the front and rear housing end cap 43, 44. At least one of the housing end caps 43, 44 is provided with a fin pattern 45. Preferably, both housing end caps are finned. The fin pattern 45 is designed to provide an air cooling of the housing to an environment. Herewith, a dry concept of the motor pump unit MPU is provided. The dry concept MPU includes an air cooling. Heat generated by the coils 22 at the coil support 42 is conducted to the housing end cap 43 and dissipated to the environment by the fin pattern 45.

As shown in FIG. 1, the fin pattern 45 covers more than 50% of an end face surface of the housing end cap. In particular, the fin pattern 45 covers more than 70% of the end face surface, more in particular the fin pattern covers more than 90% of the end face surface. Here, the fin pattern 45 has a cross-shape fin pattern in which fins are directed in perpendicular directions. Preferably, both the front and the rear housing end caps 43, 44 are provided with a fin pattern 45.

As shown in FIG. 1, at a central region, the housing end cap 43 is provided with an outlet port 35 and an inlet port 36. The outlet port and inlet port are side by side positioned at a central region of the housing and 43.

Preferably, the housing end cap 43 is integrally shaped with the housing body 41, in particular integrally shaped with the first housing portion 411. The inlet port 36 is in fluid communication with the pump chamber 410 via a return line 34. The outlet port 35 is in fluid communication with the pump chamber 410 via a pressure line 33. Preferably, at least one of the return line 34 and pressure line 33 is used for cooling the housing 4. Instead of a direct fluid connection with the pump chamber, the return line 34 and/or the pressure line 33 extends along a cooling path 37 along a certain distance through the housing 4. In particular, the cooling path 37 extends across at least 60%, in particular at least 80% of a cross-sectional region of the housing end cap. The cooling path may extend from an outer diameter to an inner diameter of the housing end cap. The cooling path 37 may for example extend spirally through the housing end cap. Herewith, the housing end cap is cooled by a hydraulic fluid flow. Both the pressure and return line 33, 34 can be used for a liquid cooling of the housing end cap.

Preferably, the return line 34 is configured for a liquid cooling of the housing end cap 43. With respect to the pressure line 35, the return line 34 may extend along a significant longer cooling path length through the housing 4. In particular, the cooling path length of the return line 34 is at least three times longer than the path length of the pressure line 35. More in particular, the cooling path length of the return line 34 is at least 10 times longer than the path length of the pressure line 35. Hydraulic fluid which is supplied to the housing 4 from the outside may be cooled by the environment before flowing through the inlet port 36.

Figure 4:
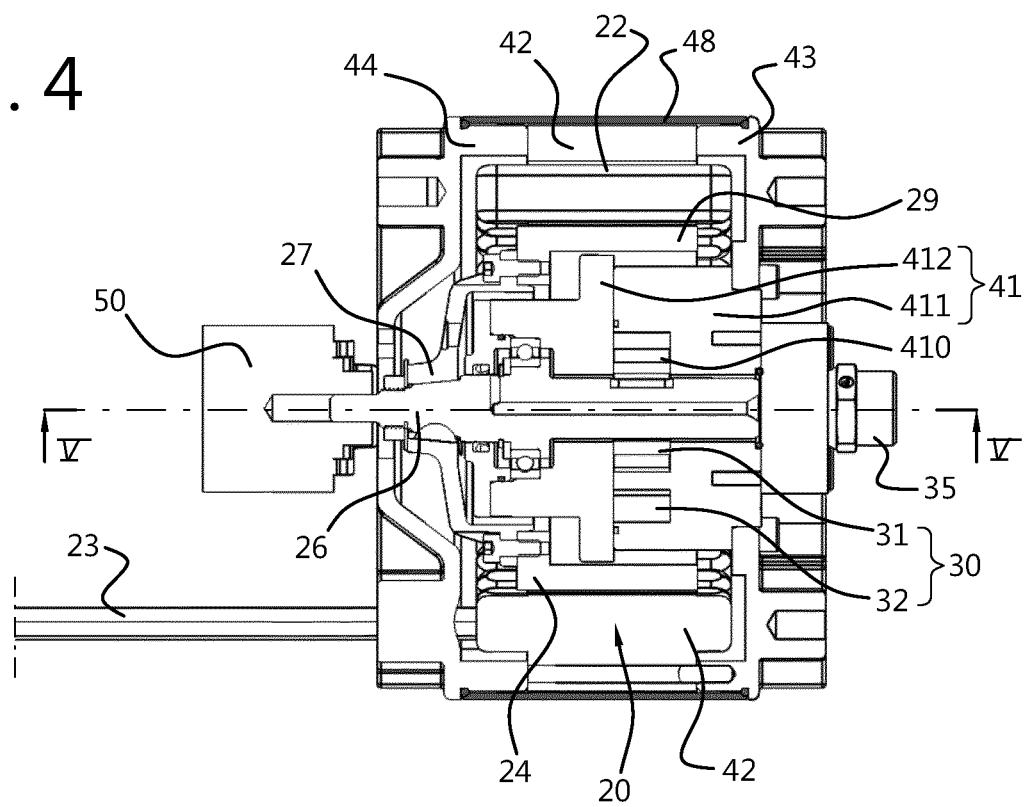
FIG. 4 shows a cross sectional view on line IV IV in FIG. 3.

As shown in FIG. 4, the housing body 41 has a central passage for receiving the motor rotor body 25, in particular a rotor shaft 26 of the motor rotor body 25. A first and second bearing 46, 47 are positioned in the central passage for journaling the motor rotor body. The first and second bearing are each a plain bearing. The plain bearing allows a lubricating through flow of hydraulic fluid originating from the pump chamber to flow to an opposite side of the respective first and/or second bearing.

Figure 5:
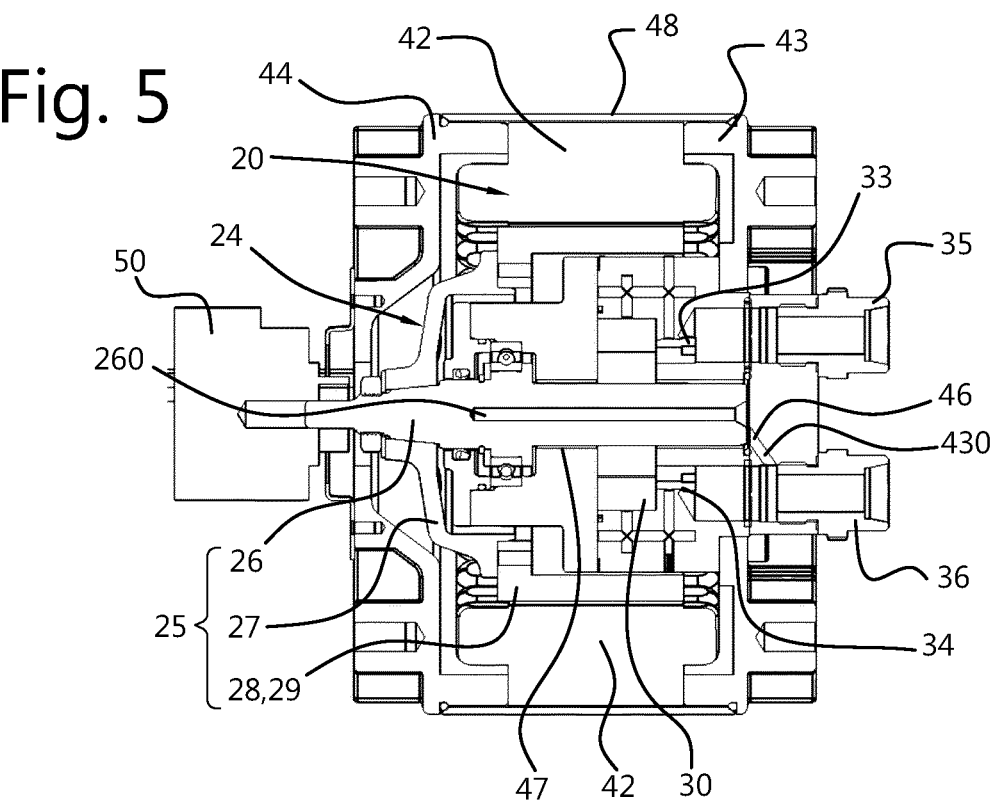
FIG. 5 shows a cross-sectional view online V-V in FIG. 4.
Figure 6:
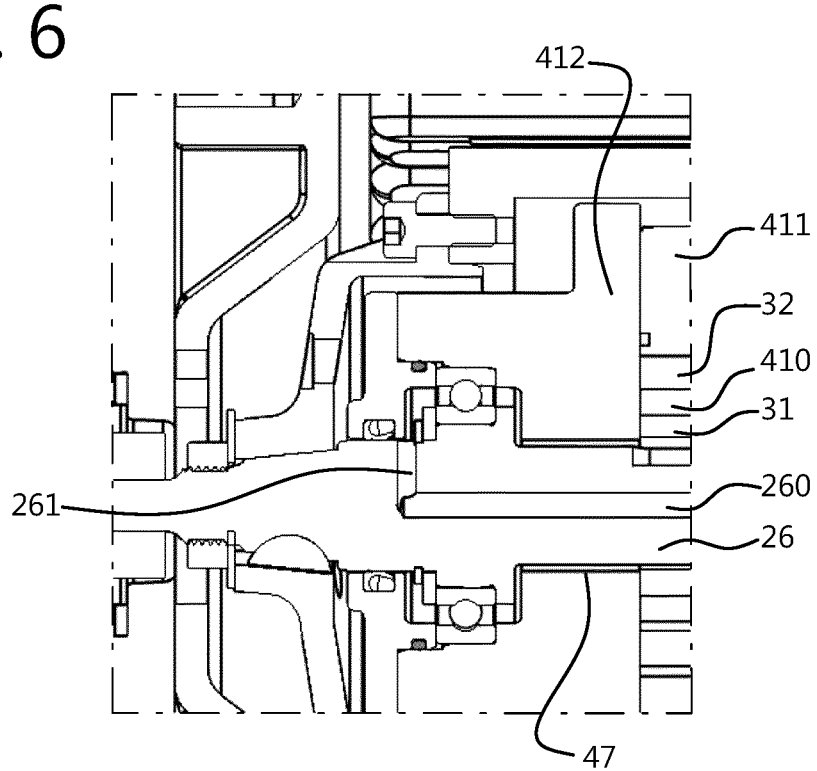
FIG. 6 shows an enlarged view of a left side of FIG. 5.
Figure 7:
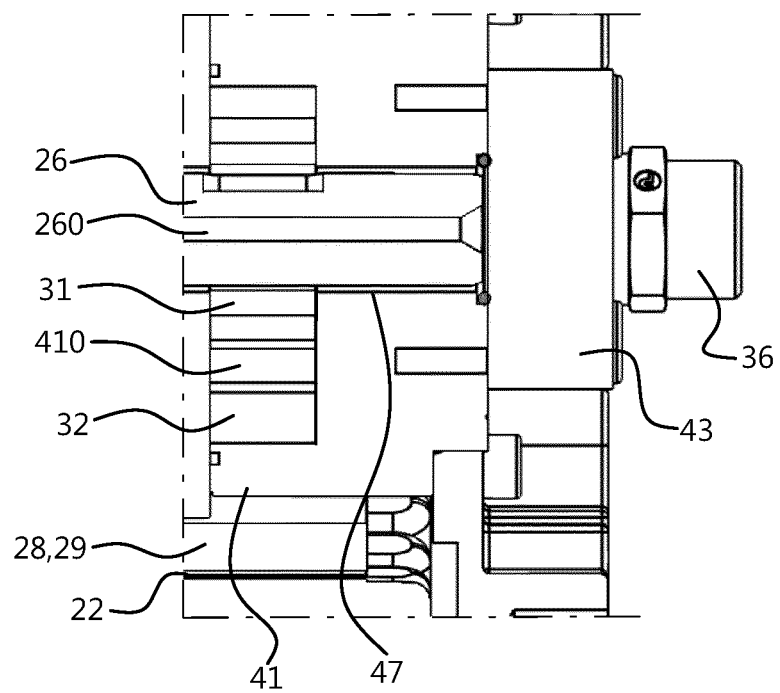
FIG. 7 shows an enlarged view of a right side of FIG. 5.

As shown in FIGS. 5 and 6, the rotor shaft 26 is provided with a rotor shaft channel 260. The rotor shaft channel 260 extends axially from a proximal end of the rotor shaft 26 along the first and second bearing 46, 47 and is fluidly connected to a channel branch 261 which is in fluid communication with an inner space outside the pump chamber. Hydraulic fluid can flow from behind the second bearing through the rotor shaft channel 260 and a housing channel 430 back into the return line 36.

The motor pump unit 1 comprises a brushless motor, in particular a brushless DC motor, more in particular a high voltage DC motor. The brushless motor is in particular an 800V or 400V DC motor. As shown in the figures, an electrical connection 23 is provided at a rear side of the motor pump unit. The electrical connection 23 is positioned at the rear housing end cap 44. The electrical connection 23 is positioned at an end face of the motor pump unit opposite an end face provided with the inlet port and outlet port 35, 36. Here, the pressure line and return line 33, 34 only extend through the front housing end cap 43.

Although the present invention has been described in detail, it will be apparent to those skilled in the art that various changes and modifications can be made without departing from the scope of the invention as hereinafter claimed. It is intended that all such changes and modifications be encompassed within the scope of the present disclosure and claims.

Thus, the invention provides a hydraulic motor pump unit 1 for pressurising a hydraulic fluid in a hydraulic circuit. The motor pump unit comprises a motor 2 having a motor stator holding a circular array of coils and a motor rotor having a motor rotor body having an outer circumferential rotor surface holding a circular array of magnets. The motor rotor body is positioned within the motor stator holding the magnets opposite the coils. A pump 3 is drivable connected to the motor rotor. A housing body 41 provided with a pump chamber 410 for housing the pump and a cylindrically shaped coil support 42 for supporting the circular array of coils. The housing comprises at least one housing end cap 43 which is connected to the coil support 42 which housing end cap is provided with a fin pattern 45 for an air cooling of the housing to an environment.

In the FIGS. 8-15, according to a second aspect of the invention, a wet concept of the motor pump unit MPU is denoted overall by reference numeral 1. In the wet concept, the MPU is liquid cooled. A fin pattern is not necessary. Identical reference signs are used in the drawings to indicate identical or functionally similar components.

To facilitate comprehension of the description and of the claims the words longitudinal, axial, frontal, proximal, rear and distal are used in a non-limiting way. Terms such as 'front', 'rear', 'radial', 'axial', 'lateral', and 'longitudinal' will be used herein to describe the relative placement and orientation of the motor pump unit and its various components, each with respect to the geometry and orientation of the motor pump unit 1 as it appears in FIG. 9 and FIG. 10.

Figure 9:
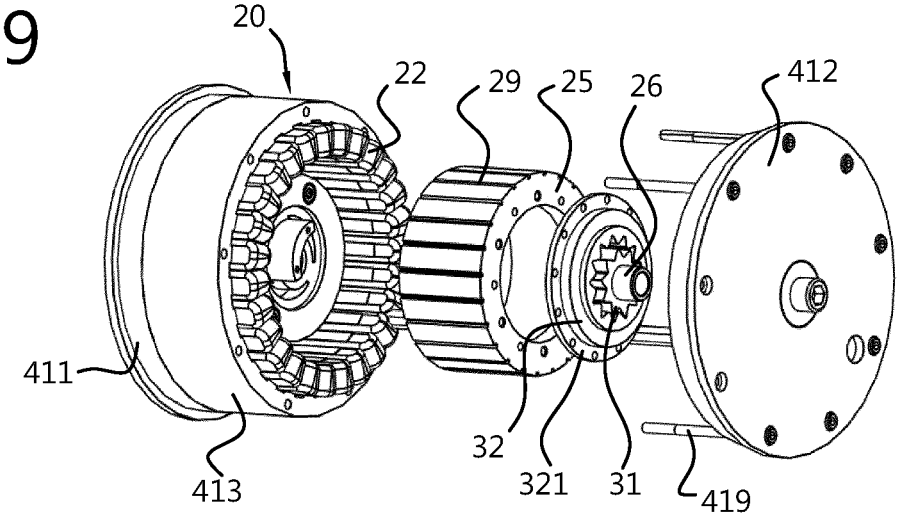
FIGS. 9 and 10 show an exploded view of the motor pump unit of FIG. 8 including a motor stator with coils, a motor rotor and a crescent gear pump.

Particularly, the left side of the motor pump unit 1 in FIG. 9 shall be referred as the 'bottom' or 'rear' of the motor pump unit 1, and the right side of the motor pump unit 1 in FIG. 9 shall be referred to as the 'top' or 'front' of the motor pump unit 1. The terms 'length' and 'thickness' shall be used interchangeably herein to refer to the dimensions of various components of the motor pump unit 1 in the top-bottom, longitudinal, or axial direction. The aforementioned terminology will include the words specifically mentioned, derivates thereof, and words of similar import.

Figure 8:
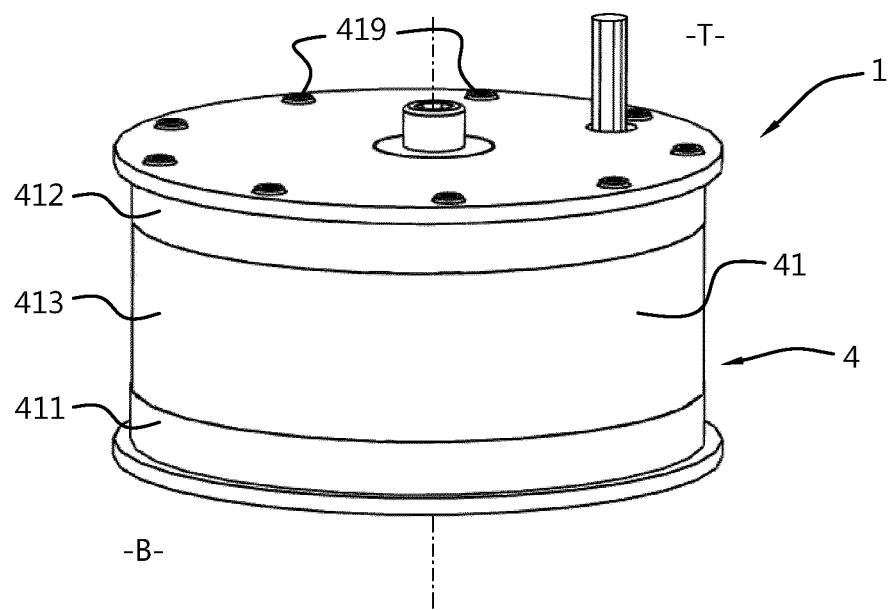
FIG. 8 shows a perspective view of an embodiment of a motor pump unit according to a second aspect of the invention.

FIG. 8 shows in a perspective view an embodiment of the hydraulic motor pump unit 1 according to the second aspect of the invention. The motor pump unit 1 is arranged to pressurise a hydraulic fluid in a hydraulic circuit. The motor pump unit 1 comprises a motor 2 and a crescent gear pump 3 which are positioned inside a housing 4.

The housing 4 has a housing body 41 for housing the motor 2 and the crescent gear pump 3. The housing body 41 is formed by clamping a first housing portion 411 and a second housing portion 412 on each other. The first and second housing portion 411, 412 are mounted to each other by a plurality of circumferentially positioned bolts 419.

Here, a ring-shaped third housing portion 413 is provided as a separate item which third housing portion 413 is sandwiched in between the first and second housing portion 411, 412. Alternatively, the ring-shaped third housing portion 413 may be integrally shaped with one of the first and second housing portion 411, 412.

An electric cable 23 extends from external through the second housing portion 412 to the motor 2 being situated inside the housing 4. Here, the external cable 23 is connected to the motor pump unit 1 at a top side T of the housing 4.

Figure 10:
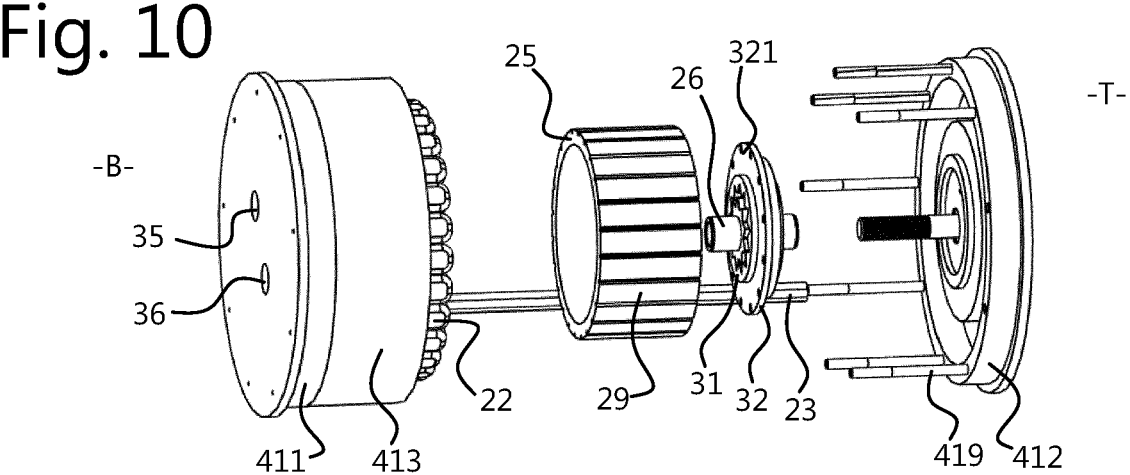

FIGS. 9 and 10 show an exploded view of the motor pump unit 1. The motor pump unit 1 is an integral motor pump unit which houses both a motor 2 and a pump 3 in a common housing 4. The motor 2 has a motor stator 20 a motor rotor 24.

The motor stator 20 is arranged to hold a circular array of coils 22. The coils 22 are positioned around an axial axis A-A of the motor pump unit 1. Here, the motor stator 20 is formed by the ring-shaped third housing portion 413 which holds the coils 22.

The motor rotor 24 comprises a motor rotor body 25. The motor rotor body 25 has a cylindrical portion. A plurality of magnets 29 is arranged on an outer circumferential surface of the cylindrical portion. In an assembly of the motor pump unit 1, the plurality of magnets 29 are positioned in a circular array opposite the coils 22 of the motor stator 20. A clearance is provided in between the magnets 29 and the coils 22. The clearance forms an inner space IS in between the motor stator 20 and the motor rotor 24. As will be explained in further detail hereafter, the inner space IS is in fluid communication with a gear pump space GPS to obtain a cooling of the coils 22 by a flow of hydraulic fluid.

Figure 11:
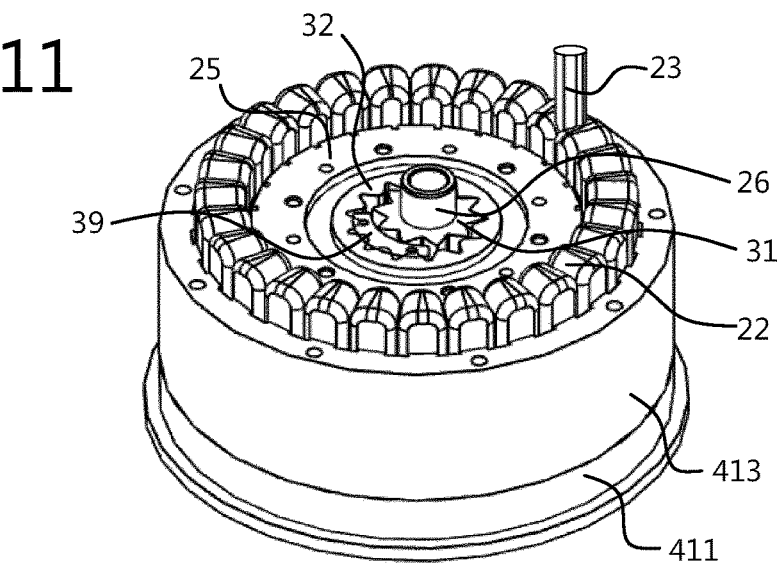
FIG. 11 shows a perspective view of the motor pump unit of FIG. 8 without a top portion of a housing.

The gear pump 3 is a crescent gear pump 30. FIG. 11 further shows in a perspective view a subassembly of the motor 2 and the crescent gear pump 30 housed by the first and third housing portion 411, 413. The crescent gear pump 30 comprises an inner gear wheel 31, an outer gear wheel 32 and a crescent member 39. The inner gear wheel 31 is journalled by a shaft member 26. The shaft member 26 is fixed to the first pump housing 411. The shaft member 26 forms a radial plain bearing to allow the inner gear wheel 31 to freely rotate. The inner gear wheel 31 and the crescent member 39 are positioned side-by-side inside the outer gear wheel 32. The inner gear wheel 31 is positioned off-set from a central axis of the outer gear wheel 32 to generate a pump capacity. The outer gear wheel 32 is connected to the driveable motor rotor body 25. Herewith, the crescent gear pump 30 is operable by driving the outer gear wheel 32.

The outer flange 321 is arranged for mounting the outer gear wheel 32 to the motor rotor body 25. Many ways of mounting the outer gear wheel 32 to the motor rotor body 25 are conceivable. Here, as exemplarily shown in FIG. 9 and FIG. 10, the outer gear wheel 32 has an outer flange 321. Here, the outer flange 321 is provided with a circular array of through holes and the motor rotor body 25 is provided with a circular array of thread holes to mount the outer gear wheel 32 to the motor rotor body 25 by bolts.

Figure 12:
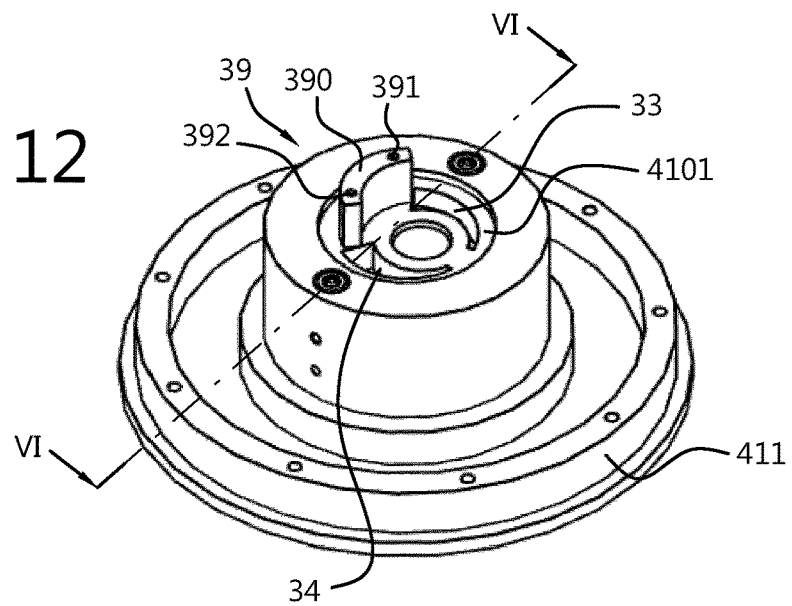
FIG. 12 shows a bottom portion of the housing of the motor pump unit of FIG. 11 including a central region with a pump chamber for receiving the crescent gear pump.
Figure 13:
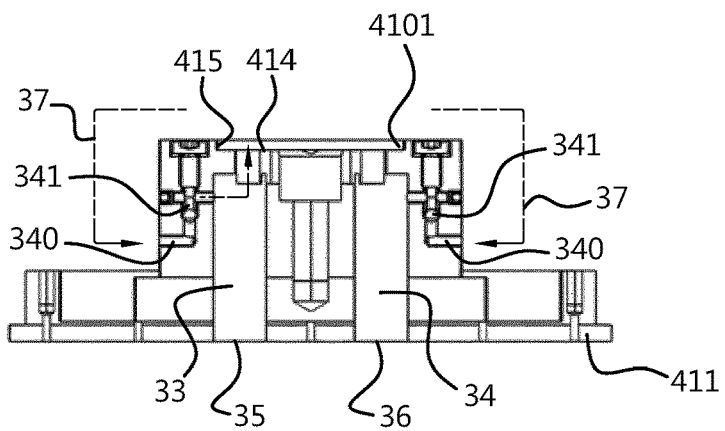
FIG. 13 shows a cross-sectional view of the bottom portion of FIG. 12 including a return channel for circulating a hydraulic fluid along a cooling path through an inner space between the motor stator and motor rotor.

FIG. 12 and FIG. 13 show the first housing portion 411 in a perspective view and cross-sectional view. The first housing portion 411 has a central portion protruding from a base portion. In the assembly of the motor pump unit, the central portion is received in a hollow space at a bottom side of the motor rotor body 25.

A first pump chamber 4101 is positioned at a top side of the central portion. The first pump chamber 4101 is configured to receive the crescent gear pump 30. The first pump chamber 4101 is formed by a deepening. The first pump chamber 4101 has a pump chamber bottom surface 414 and a pump chamber circumferential wall 415.

As further shown in FIG. 12, the crescent member 39 is integrally shaped with the first housing portion 411. Particularly, the crescent member 39 is integral with the first pump chamber 4101. The crescent member 39 is not a separate item to be mounted to the first housing portion for 11. The crescent member 39 and the first housing portion 411 are a one-piece item.

The crescent member 39 has a crescent member end face 390. The crescent member end face 390 is adapted to be positioned in an abutting engagement with the second housing portion 412 opposite the first housing portion 411 in the assembly of the motor pump unit 1. The crescent member 39 has a height relative to the pump chamber bottom surface 414 which determines a height of a gear pump space GPS in which the crescent gear pump 30 is received. The height is measured in the axial direction A-A. The crescent member 39 can be machined together with the first pump chamber 4101, such that the crescent member end face 390 is accurately dimensioned in height with respect to the pump chamber bottom surface 414. Due to the accurate dimensioning of the height of the gear pump space GPS, an accurate axial gap is obtained in between the crescent gear pump 30, in particular the outer gear wheel 32, and the first and second housing portion 412. The accurate axial gap provides a hydrostatic bearing to the crescent gear pump. In addition, the accurate axial gap allows a hydraulic fluid flow along the crescent gear pump in a radial direction towards the inner space IS. The hydraulic fluid flow is beneficial in providing a cooling to the coils 22 being in thermal engagement with hydraulic fluid present in the inner space IS.

Here, as shown in FIG. 12, the crescent member end face 390 is formed by a first stopper end face 391 and a second stopper end face 392. Each stopper end face is formed by a protrusion at a top face of the crescent member 39. Each stopper end face has an accurate height relative to the pump chamber bottom surface 414. The accurate height defined by two points beneficially contributes to an accurate axial dimensioning of the gear pump space GPS in between the first and second housing portion 411, 412.

FIG. 12 and the cross-sectional view in FIG. 13, further show a central hole in the first pump chamber 4101 for receiving the shaft member 26. The central hole is aligned with a threaded hole. The shaft member 26 is a hollow shaft member. The shaft member 26 has a shaft length. In the assembly of the motor pump unit 1, a shaft height extending from the pump chamber bottom surface 414 determines together with the predetermined height of the crescent member 39 a height of the gear pump space GPS and hence an axial gap in between the crescent gear pump 30 at a side of the first and second housing portion 411, 412.

The shaft length determines the shaft height of the shaft member 26 measured from the first pump chamber bottom surface 414. To obtain an accurate shaft height, the shaft member 26 may be machined after placement of the shaft member 26 in the central hole. Preferably, a top end face of the shaft member 26 is machined together with the crescent member end face 390 to obtain a precise dimensioning of the height of the gear pump space GPS.

Figure 14:
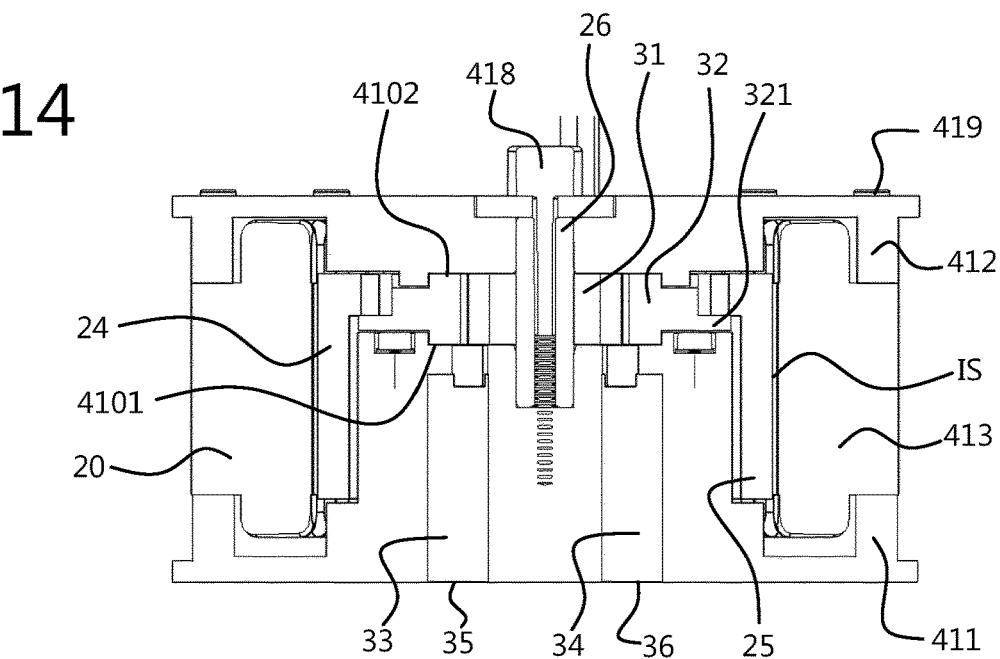
FIG. 14 shows in a cross-sectional view an assembly of the motor pump unit of FIG. 8 in which the top portion of the housing is clamped by a central bolt to the bottom portion of the housing.

As shown in a cross-sectional view of the motor pump unit 1 in FIG. 14, the second housing portion 412 has a through hole for receiving the shaft member 26. After placement of the second housing portion 412 on top of the first housing portion 411, the second housing portion 412 is clamped by a central bolt 418, such that a top surface of the second housing portion 412 lays flush with the top end face of the shaft member 26. Herewith, the shaft member 26 determines a positioning of the second housing portion 412 relative to the first housing portion 411 and hence the axial gap in the gear pump space GPS. Here, the central bolt 418 has a bolt head which is in the assembly of the motor pump unit supported by a spacer ring in which the spacer ring aligns the second housing portion 412 with the end face of the shaft member 26.

The shaft height of the shaft member 26 and the height of the crescent member 39 together determine the height of the gear pump space GPS. The shaft height may form a third point besides the first and second stopper end face 391, 392 of the crescent member. The determination of the height of the gear pump space GPS by the first, second and third point is beneficial to obtain an precise height. By clamping the central bolt 418, a momentum is introduced with respect to the crescent member 39. Clamping the second housing portion 412 onto the shaft member 26 contributes to obtain a precise axial gap in the year pump space GPS. A positioning of the first, second and third point all in the first pump chamber 4101 is beneficial to obtain a precise height at the positioning of the crescent gear pump 3.

Figure 3:
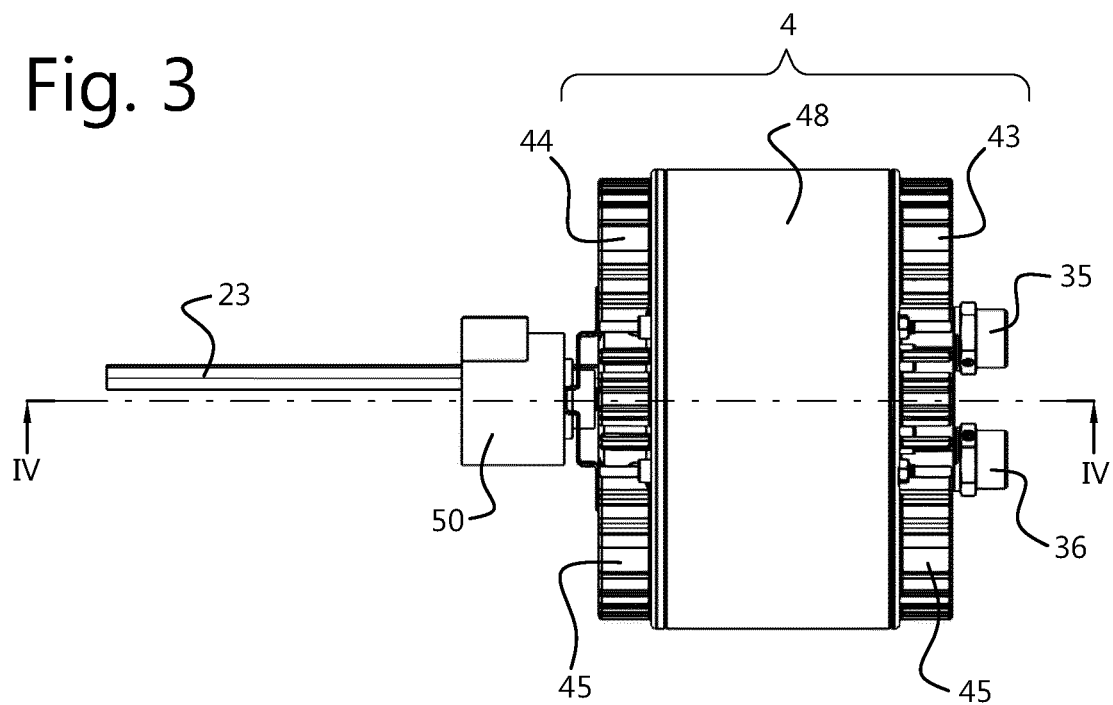
FIG. 3 shows a top view of the motor pump unit of FIG. 2.

As further shown in FIG. 13, the central portion of the first housing portion 411 is provided with a pressure line 33 and a return line 34. The pressure line 33 has an outlet port 35, and the return line 34 has an inlet port 36. Here, the ports 35, 36 are positioned at a bottom side of the first housing portion 411 which is also shown in FIG. 3. The pressure line 33 and the return line 34 are in fluid communication with the first pump chamber 4101. Here, the gear pump 3 is a reversible gear pump. In dependence of a rotational direction, a port and line may serve as a pressure line 33 or a return line 34.

As shown in FIG. 13, the hydraulic fluid may flow along a cooling path 37 from the gear pump space GPS to the inner space IS. At least one return channel 340 is provided to return the hydraulic fluid back to the gear pump space GPS. The return channel 340 is in fluid communication with a return line 33 of the crescent gear pump 30.

Here, the crescent gear pump 30 is a reversible pump. Both lines may serve as a pressure or return line 33, 34 and are each provided with a return channel 340. Each return channel 340 includes a check valve 341 to prevent a fluid flow through the return channel 340 from a pressure line 33 towards the inner space IS.

Figure 15:
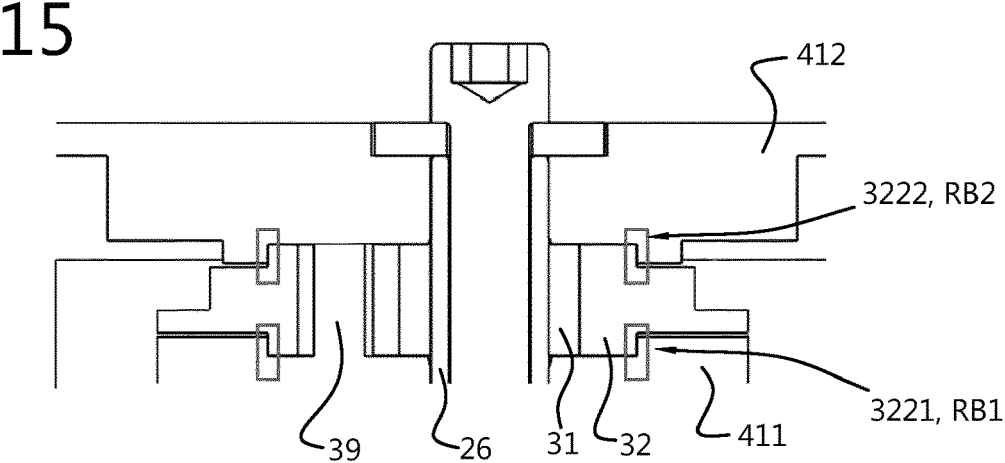
FIG. 15 shows an enlarged view of a gear pump space in between the top and bottom portion of the housing including a first and second radial bearing formed by a circumferential walls of the pump chambers.
Figure 16:
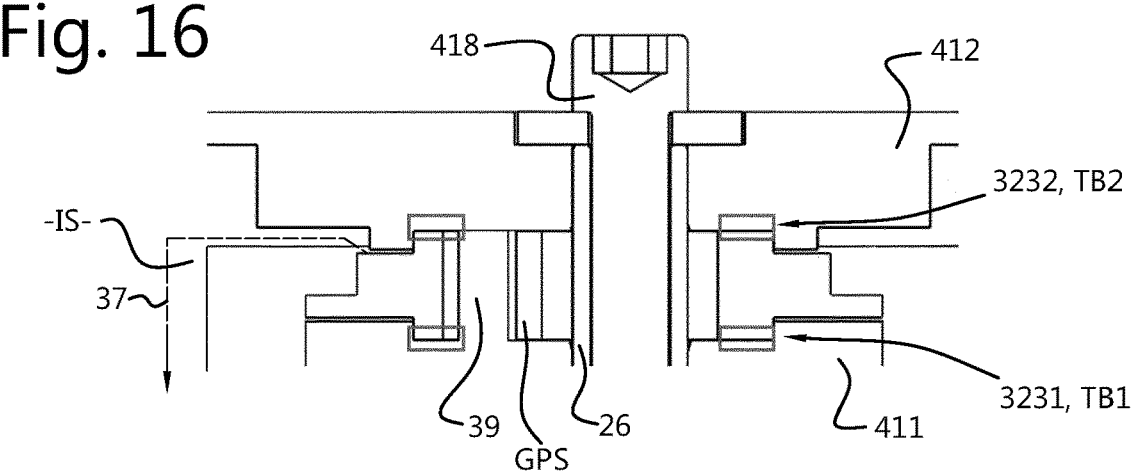
FIG. 16 shows an enlarged view of the gear pump space including an axial bearing formed by bottom surfaces of the pump chambers.

In FIGS. 15 and 16, the bearings in a radial and axial direction for bearing the gear pump 3 in the gear pump space GPS is further detailed.

FIG. 15 shows a radial form fit of the gear pump 3 which is determined by at least one pump chamber 410. Here, a first and second pump chamber 4101, 4102 are provided to radially position the gear pump 3 at a bottom region and at a top region of the gear pump 3. Each pump chamber 4101, 4102 has a pump chamber circumferential wall 415 which is arranged to journal the motor rotor 24.

The pump chamber circumferential wall 415 together with a radial outer surface of the motor rotor 24 forms a radial plain bearing RB1, RB2. The radial outer surface of the motor rotor 24 is here a radial outer surface 322 of the outer gear wheel 32. Here, each radial plain bearing RB1, RB2 engages to a radial outer surface 3221, 3222 of the outer gear wheel 32. Each radial plain bearing RB1, RB2 includes an axial gap which allows a passage of a fluid flow. In operation of the crescent gear pump, a hydraulic fluid flows from the gear pump space GPS through the radial plain bearing RB1, RB2 along the cooling path 37 towards the inner space IS in between the motor stator 20 and the motor rotor 24.

FIG. 16 shows an axial form fit of the gear pump 3 inside the gear pump space GPS. The obtained precise height of the gear pump space GPS determines an axial gap below and above the gear pump 3. Each thrust bearing TB1, TB2 is formed by the pump chamber bottom surface 414 and a gear wheel end face 323. Each thrust bearing TB1, TB2 includes a radial gap which allows a passage of fluid flow. Each thrust bearing TB1, TB2 functions as a hydrostatic bearing. In operation of the crescent gear pump 30, a hydraulic fluid from the gear pump space GPS passes the thrust bearing TB1, TB2 along the cooling path 37 to the inner space IS in between the motor stator 20 and the motor rotor 24.

Thus, the invention provides a hydraulic motor pump unit 1 with a high pressure gear pump 3 including a crescent member 39 situated in a gear pump space GPS in between a clamped first and second housing portion 411, 412. Both a predetermined height of the crescent member 39 and a predetermined shaft height of a shaft member 26 journaling an inner gear wheel 31 provide a precise axial form fit TB1 to allow a radially directed flow of hydraulic fluid through an axial gab along a cooling path 37 to pass out of the gear pump space along the outer gear wheel 32 to an inner space IS between the motor rotor 24 and the motor stator 20. Advantageously, heat generated by motor coils 22 is effectively dissipated from the inner space (IS) by passing hydraulic fluid. In this, FIG. 16 is illustrative.

Although the present invention has been described in detail, it will be apparent to those skilled in the art that various changes and modifications can be made without departing from the scope of the invention as hereinafter claimed. It is intended that all such changes and modifications be encompassed within the scope of the present disclosure and the above mentioned clauses.

| Reference signs list FIG. 1-7: | |
|---|---|
| A-A axial axis | 32 outer gear wheel 33 pressure line |
| 1 motor pump unit | 34 return line |
| 2 motor | 35 outlet port |
| 3 pump | 36 inlet port |
| 4 housing | 37 cooling path |
| 20 motor stator | 4 housing |
| 22 coil | 41 housing body |
| 23 connector; electrical connection | 410 pump chamber |
| 24 motor rotor | 411 first housing portion |
| 25 motor rotor body | 412 second housing portion |
| 26 rotor shaft | 42 coil support |
| 260 rotor shaft channel | 43 front housing end cap |
| 261 channel branch | 430 channel |
| 27 rotor flange | 44 rear housing end cap |
| 28 magnet holder | 45 fin pattern |
| 29 magnet | 46 first bearing; first plain bearing |
| 30 internal gear pump | 47 second bearing; second plain bearing |
| 31 inner gear wheel | |
| | 48 casing 50 decoder |
| Reference signs list FIG. 8-15: | |
| A-A axial axis | T top |
| B bottom | 40 GPS gear pump space |
| IS inner space | 36 inlet port |
| RB radial bearing | 37 cooling path |
| TB thrust bearing; axial bearing | 39 crescent member |
| 1 motor pump unit | 390 crescent member end face |
| 2 motor | 391 first stopper end face |
| 3 gear pump | 392 second stopper end face |
| 4 housing | 4 housing |
| 20 motor stator | 41 housing body |
| 21 | 410 pump chamber |
| 22 coil | 4101 first pump chamber |
| 23 connector; electrical connection; electric cable | 4102 second pump chamber |
| | 411 first housing portion central portion |
| 24 motor rotor | base portion |
| 25 motor rotor body cylindrical portion | 412 second housing portion |
| 26 rotor shaft; shaft member | 413 third housing portion |
| 260 rotor shaft channel | 414 pump chamber bottom surface |
| 261 channel branch | 415 pump chamber circumferential wall |
| 27 rotor flange | |
| 28 magnet holder | 418 central bolt |
| 29 magnet | 419 bolt |
| 30 crescent gear pump | 42 coil support |
| 31 inner gear wheel | 43 front housing end cap |
| 32 outer gear wheel | 430 channel |
| 321 outer flange | 44 rear housing end cap |
| 322 outer gear wheel radial outer surface | 45 fin pattern |
| | 46 first bearing; first plain bearing |
| 323 gear wheel end face | 47 second bearing; second plain bearing |
| 33 pressure line | |
| 34 return line | 48 casing |
| 340 return channel | 50 decoder |
| 341 check valve | |
| 35 outlet port | |

The invention claimed is:

1. A vehicle sub-assembly comprising a hydraulic motor pump unit for pressurising a hydraulic fluid in a hydraulic circuit, wherein the motor pump unit comprises:

a motor having a motor stator holding a circular array of coils and a motor rotor having a motor rotor body having an outer circumferential rotor surface holding a circular array of magnets, in which the motor rotor body is positioned within the motor stator holding the magnets opposite the coils;

a pump drivable connected to the motor rotor; and a housing having a housing body provided with a pump chamber for housing the pump and a cylindrically shaped coil support for supporting the circular array of coils;

wherein the housing comprises at least one housing end cap which is connected to the coil support which housing end cap is provided with a fin pattern for an air cooling of the housing to an environment, and wherein the vehicle sub-assembly is arranged to be continuously active during a ride for at least 10 minutes in which the hydraulic motor pump unit is then operable under a high pressure of at least 100 bars for actuating a hydraulic actuator.

2. The vehicle sub-assembly according to claim 1, wherein the housing has a front housing end cap and a rear housing end cap which are each provided with a fin pattern, wherein the coil support is sandwiched in between the front and rear housing end cap.

3. The vehicle sub-assembly according to claim 1, wherein at least a portion of 50% of an end face surface of the housing end cap is covered by the fin pattern.

4. The vehicle sub-assembly according to claim 1, wherein the at least one housing end cap is integrally shaped with the housing body.

5. The vehicle sub-assembly according to claim 1, wherein the at least one housing end cap is provided with an outlet port and an inlet port in fluid communication with the pump chamber, wherein the inlet port and the outlet port are positioned at a central region of an end face of the housing end cap.

6. The vehicle sub-assembly according to claim 1, wherein at least one of an outlet port and inlet port is fluidly connected to the pump chamber by respectively a pressure line for pressurising an actuator and a return line for returning hydraulic fluid to the pump chamber, wherein the pressure line and/or return line extends along a cooling path through the housing end cap to provide liquid cooling to the housing end cap.

7. The vehicle sub-assembly according to claim 6, wherein the return line originating from the inlet port extends across the housing end cap along the cooling path for cooling the housing end cap, wherein with respect to the pressure line, the return line extends along a significant longer cooling path length through the housing.

8. The vehicle sub-assembly according to claim 6, wherein the cooling path extends across at least 60% of a cross sectional region of the housing end cap.

9. The vehicle sub-assembly according to claim 1, wherein the housing body has a central passage for receiving the motor rotor body, wherein the central passage is provided with a first and second bearing for journaling the motor rotor body, wherein the pump chamber is positioned in between the first and second bearing.

10. The vehicle sub-assembly according to claim 9, wherein the first and/or second bearing are a plain bearing allowing a lubricating through flow of hydraulic fluid originating from the pump chamber to an opposite side of the respective first and/or second bearing.

11. The vehicle sub-assembly according to claim 10, wherein the lubricating through flow at the second plain bearing is passed to a return line to return the lubricating through flow back to the pump chamber.

12. The vehicle sub-assembly according to claim 1, wherein the motor is a brushless motor.

13. The vehicle sub-assembly according to claim 1, wherein the coils of the motor have an electrical connection at a rear housing end cap, wherein a pressure line and return line only extend through a front housing end cap.

14. The vehicle sub-assembly according to claim 1, wherein the pump is a gear pump.

15. The vehicle sub-assembly according to claim 1, wherein the motor rotor body comprises a rotor shaft which has a centrally positioned inner rotor shaft channel along an axial axis in fluid communication with an inlet port.

16. The vehicle sub-assembly according to claim 15, wherein the rotor shaft channel extends from a first bearing beyond a second bearing for allowing a flow of hydraulic fluid back to the inlet port.

17. The vehicle sub-assembly according to claim 15, wherein the rotor shaft is at a distal end connected to a rotor flange and a cylindrically shaped magnet holder.

18. The vehicle sub-assembly according to claim 17, wherein the rotor flange and magnet holder are incorporated in a one-piece item.

19. The vehicle sub-assembly according to claim 1, wherein the motor rotor body is connected to an angular decoder for determining a rotational position of the motor rotor body.

20. The vehicle sub-assembly according to claim 1, wherein the vehicle sub-assembly is a vehicle active roll stabilisation system including a stabiliser bar to be positioned in between a left and right wheel suspension and including a hydraulic actuator connected to the stabiliser bar, wherein the hydraulic actuator is controlled by a control unit and actuated by the motor pump unit.

21. A vehicle comprising the vehicle sub-assembly according to claim 1.

* * * * *